United States Patent
Siriwardane et al.

(10) Patent No.: US 8,128,735 B1
(45) Date of Patent: Mar. 6, 2012

(54) PROCESS FOR CO₂ CAPTURE USING ZEOLITES FROM HIGH PRESSURE AND MODERATE TEMPERATURE GAS STREAMS

(75) Inventors: Ranjani V. Siriwardane, Morgantown, WV (US); Robert W. Stevens, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 398 days.

(21) Appl. No.: 12/582,760

(22) Filed: Oct. 21, 2009

(51) Int. Cl.
*B01D 53/04* (2006.01)

(52) U.S. Cl. ............................................. 95/115; 95/139

(58) Field of Classification Search .................... 95/107, 95/114, 115, 117, 139, 148, 902; 423/230
See application file for complete search history.

(56) References Cited

U.S. PATENT DOCUMENTS

| | | | | |
|---|---|---|---|---|
| 3,594,983 A | * | 7/1971 | Yearout | 95/97 |
| 4,770,676 A | * | 9/1988 | Sircar et al. | 95/99 |
| 5,846,295 A | * | 12/1998 | Kalbassi et al. | 95/105 |
| 5,855,650 A | | 1/1999 | Kalbassi et al. | |
| 5,968,234 A | | 10/1999 | Midgett, II et al. | |
| 7,736,416 B2 | * | 6/2010 | Nalette et al. | 95/1 |
| 8,025,720 B2 | * | 9/2011 | Barclay et al. | 96/115 |
| 2003/0126989 A1 | * | 7/2003 | Bancon et al. | 95/96 |

OTHER PUBLICATIONS

Siriwardane et al, "Adsorption of CO2, N2, and O2 on natural zeolites," Energy & Fuels, vol. 17 (2003).
Siriwardane et al, "Adsorption of CO2 on Zeolites at Moderate Temperatures," Energy & Fuels, vol. 19 (2005).
Bonenfant et al, "Advances in principal factors influencing carbon dioxide adsorption on zeolites," Sci. Technol. Adv. Mater. 9 (2008).

* cited by examiner

*Primary Examiner* — Frank Lawrence, Jr.
(74) *Attorney, Agent, or Firm* — James B. Potts; Mark P. Dvorscak; John T. Lucas

(57) ABSTRACT

A method for separating $CO_2$ from a gas stream comprised of $CO_2$ and other gaseous constituents using a zeolite sorbent in a swing-adsorption process, producing a high temperature $CO_2$ stream at a higher $CO_2$ pressure than the input gas stream. The method utilizes $CO_2$ desorption in a $CO_2$ atmosphere and effectively integrates heat transfers for optimizes overall efficiency. $H_2O$ adsorption does not preclude effective operation of the sorbent. The cycle may be incorporated in an IGCC for efficient pre-combustion $CO_2$ capture. A particular application operates on shifted syngas at a temperature exceeding 200° C. and produces a dry $CO_2$ stream at low temperature and high $CO_2$ pressure, greatly reducing any compression energy requirements which may be subsequently required.

20 Claims, 2 Drawing Sheets

PROCESS FOR $CO_2$ CAPTURE USING ZEOLITES FROM HIGH PRESSURE AND MODERATE TEMPERATURE GAS STREAMS

STATEMENT OF GOVERNMENTAL SUPPORT

The United States Government has rights in this invention pursuant to the employer-employee relationship of the Government to the inventors as U.S. Department of Energy employees at the National Energy Technology Laboratory.

TECHNICAL FIELD

A method for separating $CO_2$ from a gas stream comprised of $CO_2$ and other gaseous constituents using a zeolite sorbent in a swing-adsorption process, producing a high temperature $CO_2$ stream at a higher $CO_2$ pressure than the input gas stream. The method utilizes $CO_2$ desorption in a $CO_2$ atmosphere and effectively integrates heat transfers for optimizes overall efficiency. $H_2O$ adsorption does not preclude effective operation of the sorbent. The cycle may be incorporated in an IGCC for efficient pre-combustion $CO_2$ capture. A particular application operates on shifted syngas at a temperature exceeding 200° C. and produces a dry $CO_2$ stream at low temperature and high $CO_2$ pressure, greatly reducing any compression energy requirements which may be subsequently required.

BACKGROUND OF THE INVENTION

The emission of $CO_2$ from power plants has been identified as a factor potentially resulting in long-term environmental problems. Consequently, separation of $CO_2$ from gaseous streams utilizing adsorption of gases and vapors by microporous solids has attracted attention, because of its great practical importance in the fields of gas separation and gas purification. Certain technologies based on the $CO_2$ adsorption/desorption by using natural and synthetic zeolites are among the most effective methods.

Generally, two methods are used for $CO_2$ adsorption/desorption utilizing zeolite adsorbents for $CO_2$ separation: Temperature Swing Adsorption (TSA) and Pressure Swing Adsorption (PSA). In each of these techniques, a bed of zeolite adsorbent is exposed to a flow of feed air under temperature and pressure conditions allowing the zeolite adsorbent to adsorb some portion of the carbon dioxide and water vapor present in the feed air. This exposure continues for a period of time, and typically ceases prior to break-through of carbon dioxide and water in the exiting treated feed air. Following this exposure, the flow of feed air is ceased and the adsorbent is regenerated. In a temperature swing adsorber, the carbon dioxide and water are driven off from the adsorbent by heating the adsorbent in the regeneration phase. In a pressure swing adsorber, the pressure of the regeneration gas is lower than that of the feed gas and the change in pressure is used to remove the carbon dioxide and water from the adsorbent.

There has been extensive research on the equilibrium of carbon dioxide on zeolite adsorbent materials at ambient temperature and atmospheric pressure. It is established that zeolites efficiently remove carbon dioxide and water vapor from air streams at low temperatures, i.e., temperatures of about 40° C. or lower, because it more strongly adsorbs these components than it adsorbs nitrogen, oxygen or argon. However, at lower pressures, the carbon dioxide adsorption capacity of zeolites generally diminish rapidly as the temperature of the gas being separated increases, and the separation process can become infeasible at temperatures above about 40° C. This temperature limitation is further complicated by the heat of adsorption associated with zeolites, generating the tendency for adsorption bed temperatures to increase considerably, and often necessitating adsorption bed cooling with external refrigeration to maintain the gas at temperatures below 40° C. This places significant limitation on the application of zeolites for adsorption of carbon dioxide at high temperature, which is becoming increasingly significant in fields such as emission control of fossil-fueled power systems, natural gas treatments, purification of hydrocarbons, and production of hydrogen gas, among others. In these applications and others, it would be advantageous to provide a cycle where zeolite adsorbents could be utilized in a manner preserving the adsorption capacity at higher temperatures, such that parasitic external refrigeration loads could be reduced or eliminated. Such a capability could have particular import for gaseous stream separation in the production of $H_2$ from shifted syngas using a water-gas-shift reactor, where any requirement to maintain temperature of the adsorbent bed below 20° C. levies significant refrigeration requirements. Such a capability has further advantage when separation operations occur prior to combustion of a non-adsorbed component, so that refrigeration requirements have a direct impact on the subsequent efficiency of the combustion. For example, the separation of $CO_2$ and $H_2$ from a water-gas shift (WGS) reactor in preparation for $H_2$ combustion in an Integrated Gasification Combined Cycle (IGCC) plant.

It is known that the adsorption of some zeolites increases as the pressure of the adsorbent bed in increased for some applications. See e.g., Siriwardane et al, "Adsorption of $CO_2$, $N_2$, and $O_2$ on natural zeolites," *Energy & Fuels*, Vol. 17 (2003), discussing the adsorption of certain zeolites at temperatures of 25° C. and pressures up to 300 psig. See also Siriwardane et al, "Adsorption of $CO_2$ on Zeolites at Moderate Temperatures," *Energy & Fuels*, Vol. 19 (2005), discussing the adsorption of certain zeolites at temperatures up to 120° C. and pressures up to 300 psig, and regeneration at 300° C. under an $N_2$ atmosphere. Generally speaking, investigations of diverse zeolites have indicated that the capacity for $CO_2$ adsorption is enhanced when the partial pressure of $CO_2$ increases. See Bonenfant et al, "Advances in principal factors influencing carbon dioxide adsorption on zeolites," *Sci. Technol. Adv. Mater.* 9 (2008). A swing-adsorption cycle for $CO_2$ separation using zeolites that takes advantage of the propensity for increased adsorption as pressure increases would allow zeolite use at higher temperatures, further reducing or eliminating parasitic external refrigeration loads. Additionally, and significantly, such a swing-adsorption process would have great benefit if desorption could occur at the higher pressure and produce a higher pressure $CO_2$ product stream, reducing compression burdens which might exist in sequestration and storage operations.

Further, in $CO_2$ separation for the purpose of storage and sequestration, purity of the $CO_2$ product stream is of paramount importance. Often, in swing-adsorption cycles using zeolites for $CO_2$ separation, the higher temperature or lower pressure regeneration must be assisted by the use of an inert regeneration gas to strip the adsorbed carbon dioxide and water from the adsorbent. Typical approaches utilize $N_2$, He, or some portion of the post-adsorption feed gas. See e.g., U.S. Pat. No. 5,968,234, issued to Midgett, issued Oct. 19, 1999; see also U.S. Pat. No. 5,855,650, issued to Kalbassi et al, issued Jan. 5, 1999, among others. The use of regeneration gas often increases the recovery of $CO_2$ in zeolite based swing-adsorption processes, however the practice inherently dilutes the recovered $CO_2$ stream. In applications where purity of the generated $CO_2$ stream is desired, such as in $CO_2$ sequestration and storage operations, the diluted stream must undergo further separation for removal of the regeneration gas, and further inefficiencies result. It would be advantageous to provide a swing-adsorption process for $CO_2$ separation using zeolites where sorbent regeneration could occur in an atmosphere of $CO_2$. The use of $CO_2$ as sweep gas during regeneration would result in the generation of a pure stream of the gas without the need for further gas separations.

Accordingly, it is an object of this disclosure to provide a method of $CO_2$ separation utilizing zeolite adsorbents in a manner that preserves adsorption capacities at higher temperatures, such that parasitic external refrigeration loads are reduced or eliminated.

Further, it is an object of this disclosure to provide a method of $CO_2$ separation utilizing zeolite adsorbents that takes advantage of the propensity for increased adsorption under increased $CO_2$ partial pressure and allows for higher pressure regeneration, such that a higher pressure $CO_2$ product stream is produced and compression burdens which might exist in sequestration and storage operations are reduced or eliminated.

Further, it is an object of this disclosure to provide a method of $CO_2$ separation utilizing zeolite adsorbents in a TSA process where sorbent regeneration occurs in an atmosphere of $CO_2$, such that a pure stream of the $CO_2$ is generated without the need for further gas separations.

These and other objects, aspects, and advantages of the present disclosure will become better understood with reference to the accompanying description and claims.

SUMMARY OF INVENTION

The disclosure provides a method for separating $CO_2$ from a gas stream comprised of $CO_2$ and other gaseous constituents using a zeolite sorbent in a swing-adsorption process that produces a relatively pure $CO_2$ stream during zeolite sorbent regeneration, such that further gaseous separation operations are eliminated. Additionally, the method allows for $CO_2$ adsorption at higher temperatures and higher pressures, reducing the energy loss associated with cooling gaseous streams when separation precedes combustion of a non-adsorbed component. Further, the method allows for $CO_2$ desorption in a $CO_2$ atmosphere, producing a high purity, high pressure $CO_2$ stream and reducing compression burdens which might exist in sequestration and storage operations. The method effectively lends itself to a $CO_2$ separation cycle whereby necessary heat transfers within the cycle are effectively integrated such that overall efficiency is optimized, and $H_2O$ adsorption does not preclude effective operation of the sorbent.

The regeneration of the $CO_2$ loaded zeolite sorbent in a $CO_2$ atmosphere is a novel aspect of the method disclosed herein. Adsorption occurs under a first temperature and a first $CO_2$ pressure condition, where the first $CO_2$ pressure is generally the partial pressure of $CO_2$ in an input gas stream comprised of $CO_2$, $H_2O$, and other gaseous constituents. Desorption is provoked by heating the loaded zeolite sorbent in a $CO_2$ atmosphere of at least 90 wt % $CO_2$, so that regeneration occurs at a higher, second $CO_2$ pressure, and a product $CO_2$ stream of high purity and high $CO_2$ pressure results. In a particular embodiment, the method incorporates cyclic operation of the sorbent between a capture reactor and a regeneration reactor in a thermally integrated manner for optimized efficiency. In a further embodiment, the cycle is incorporated in an IGCC for efficient pre-combustion $CO_2$ capture.

The method generally comprises: generating an input gas stream comprised of $CO_2$ and other gaseous constituents at a first $CO_2$ pressure; contacting the input gas stream with a zeolite sorbent at a first temperature and the first $CO_2$ pressure, and transferring exothermic heat; regenerating the zeolite sorbent at a higher, second temperature in a $CO_2$ atmosphere comprised of at least 90 mol % $CO_2$ to attain a second, higher $CO_2$ pressure, and providing endothermic heat, and; generating the output gas stream comprised of desorbed $CO_2$ and some portion of the $CO_2$ atmosphere, in order to produce a high purity output gas stream having a higher $CO_2$ pressure than the input gas stream. In a particular embodiment, the $CO_2$ atmosphere is maintained by a regeneration stream comprised of some portion of the output gas stream. In another embodiment, the input gas stream is further comprised of $H_2O$ and the second temperature provides for dehydration prior to moisture removal, producing a dry final $CO_2$ stream. A particular application utilizes an input gas stream of shifted syngas at a temperature exceeding 200° C., capture at approximately 150° C., and regeneration at approximately 350° C. in order to produce a final $CO_2$ stream having low moisture, low temperature, and high $CO_2$ pressure, greatly reducing any compression energy requirements which may be subsequently required.

The various features of novelty which characterize this disclosure are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the disclosure is illustrated.

DETAILED DESCRIPTION OF THE PREFERRED EMBODIMENTS

Figure 1B:
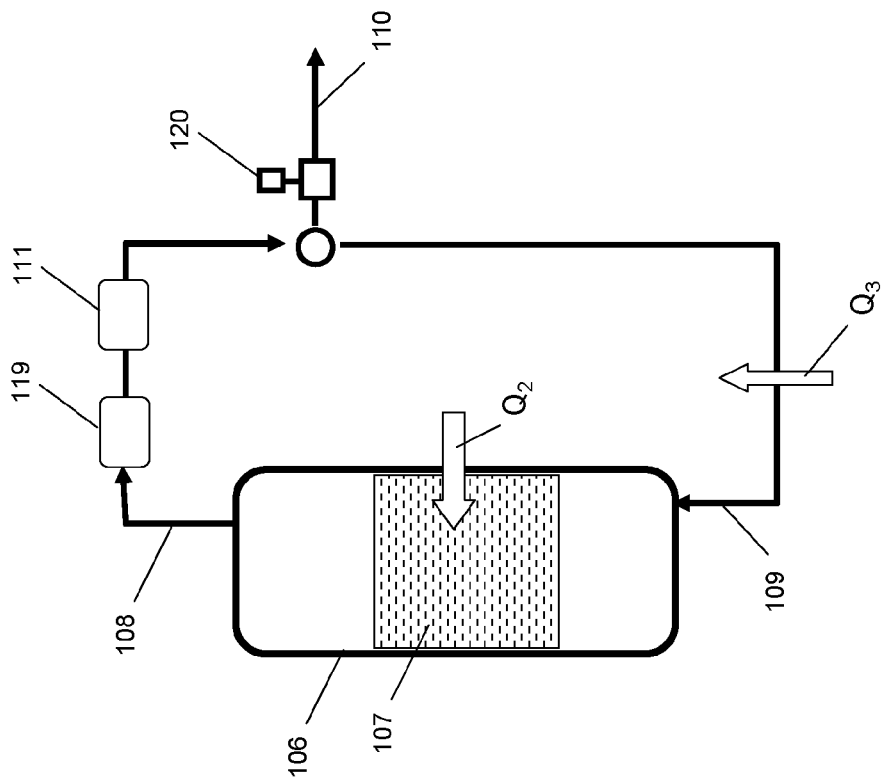
FIG. 1B illustrates the generation of a $CO_2$ stream by regenerating the zeolite sorbent in a high $CO_2$ pressure environment.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method of separating $CO_2$ from a process gas stream comprised of $CO_2$ and other gaseous constituents in an adsorption/desorption cycle using a zeolite sorbent, where the desorption cycle is conducted under conditions of increased temperature and increased $CO_2$ pressure to produce a high pressure output gas stream.

The disclosure herein provides a method for separating $CO_2$ from a gas stream comprised of $CO_2$ and other gaseous constituents using a zeolite sorbent in a swing-adsorption process that produces a relatively pure $CO_2$ stream during zeolite sorbent regeneration, such that further gaseous separation operations are eliminated. Additionally, the method allows for $CO_2$ adsorption at higher temperatures and higher pressures, reducing the energy loss associated with cooling gaseous streams when separation precedes combustion of a non-adsorbed component. Further, the method allows for $CO_2$ desorption in a $CO_2$ atmosphere, producing a high purity, high pressure $CO_2$ stream and reducing compression burdens which might exist in sequestration and storage operations. The method effectively lends itself to a $CO_2$ separation cycle whereby necessary heat transfers within the cycle are effectively integrated such that overall efficiency is optimized, and $H_2O$ adsorption does not preclude effective operation of the sorbent.

The regeneration of the $CO_2$ loaded zeolite sorbent in a $CO_2$ atmosphere is a novel aspect of the method disclosed herein. Adsorption occurs under a first temperature and a first $CO_2$ pressure condition, where the first $CO_2$ pressure is generally the partial pressure of $CO_2$ in an input gas stream comprised of $CO_2$, $H_2O$, and other gaseous constituents. Desorption is provoked by heating the loaded zeolite sorbent in a $CO_2$ atmosphere of at least 90 wt % $CO_2$, so that regeneration occurs at a higher, second $CO_2$ pressure, so that a product $CO_2$ stream of high purity and high pressure results. This is in marked contrast to standard temperature-swing adsorption processes, which often produce a diluted product stream through the use of an inert regeneration gas in order to provide a high temperature, low $CO_2$ pressure environment favorable to desorption. Similarly, this is in marked contrast to typical pressure-swing adsorption processes, which by necessity result in a product stream having a lower $CO_2$ pressure than the input gas stream. Within the novel method disclosed here, regeneration in an environment of increased $CO_2$ pressure allows for the production of a high pressure, high purity $CO_2$ stream without the necessity for further separation operations or subsequent compression, greatly aiding subsequent storage and sequestration operations. In a particular embodiment, the $CO_2$ atmosphere is provided by recirculation of the $CO_2$ product stream. In another particular embodiment, the input gas stream is further comprised of $H_2O$ and regeneration is conducted at a temperature at least 275° C., in order to desorb both $CO_2$ and $H_2O$ from the loaded zeolite sorbent, such that the zeolite sorbent may be used in a cyclic manner.

The method disclosed herein may be particularly advantageous in IGCC applications that encompass pre-combustion separation of $CO_2$ from shifted syngas. In a particular embodiment, the zeolite sorbent adsorbs $CO_2$ in a capture reactor maintained at approximately 150° C. and 280 psig, and the zeolite sorbent is regenerated and $CO_2$ desorbed in a >90 mol % $CO_2$ atmosphere in a regeneration reactor, maintained at approximately 350° C. and 280 psig. The temperature and pressure range of this novel method reduces the negative impact on IGCC efficiency associated with cooling the input shifted syngas stream to ambient, and produces a higher pressure, high purity $CO_2$ stream aiding subsequent $CO_2$ storage and sequestration operations. Additionally, and significantly, the method retains effectiveness when $H_2O$ is present in the input gas stream, eliminating the pre-emptive drying requirement associated with typical $CO_2$ removal cycles.

As used here, "zeolite" means crystalline aluminosillicates of alkali or alkali earth elements such as sodium, potassium, and calcium, represented by the stochiometry $M_{x/n}[(AlO_2)_x (SiO_2)_y]$, where x and y are integers with y/x equal to or greater than 1 and n is the valence of cation M.

As used here, "$CO_2$ pressure" means the partial pressure of $CO_2$ in a gaseous mixture having a total pressure and comprised of $CO_2$ and which may be comprised of additional constituents. Further, when the method specifies "first $CO_2$ pressure" or "second $CO_2$ pressure," in application these are considered as mean values around which variation may be expected to occur as a result of operational constraints.

As used here, "adsorption isotherm", means the relationship between a $CO_2$ pressure and the mass of $CO_2$ gas or vapor taken up per mass of zeolite sorbent at a constant temperature.

As used here, the terms "indirect" or "indirectly" when applied to heat exchange means a process of heat transfer from a heat containing medium to a heat absorbing medium without direct contact between the two media involved. For example, heat transfer from steam to a zeolite sorbent through a heat exchanger tube separating the steam and the zeolite sorbent, or heat transfer from a zeolite sorbent to a water coolant through a heat exchanger tube separating the zeolite sorbent and the water coolant, and other similar arrangements.

As used here, the term "shifted syngas" means a composition produced by a process which converts water and carbon monoxide to hydrogen and carbon dioxide. For example, a composition produced by a water gas shift process or steam reforming.

The method disclosed herein is generally practiced as a cyclical process of TSA, with the novel distinction that $CO_2$ pressure is increased during the regeneration process through utilization of concentrated $CO_2$, as opposed to typical TSA cycles. The method may be illustrated with reference to FIGS. 1A and 1B. At FIG. 1A, a process gas stream 101 comprises an input gas stream 102 from which $CO_2$ is to be separated. The input gas stream 102 is introduced into a capture vessel 103 containing a bed of the zeolite sorbent 104. The input gas stream 102 and the zeolite sorbent 104 are contacted in the capture vessel 103 at a first temperature and a first $CO_2$ pressure, where the first temperature and first $CO_2$ pressure are representative of an adsorption condition defined by an adsorption isotherm of zeolite sorbent 104 reflecting adsorption of gaseous $CO_2$.

The first temperature and the first $CO_2$ pressure may be mean values around which slight variation occurs as a result of operational constraints. The acceptable magnitude of variation of the first temperature and the first $CO_2$ pressure depends on the subsequent regeneration conditions utilized, as will be explained infra. Thus, when the method specifies maintaining a first temperature or a first $CO_2$ pressure, it is understood that this is intended to indicate maintaining these parameters within the acceptable magnitude of variation about the mean value.

Zeolite sorbent 104 may be any zeolite sorbent which adsorbs gaseous $CO_2$ in accordance with an adsorption isotherm as defined herein. Exemplary zeolite sorbents for use with this method include zeolite 4A (e.g., $Na_2O$—$Al_2O_3$-$2SiO_2$), zeolite 5A (e.g., $0.7CaO$-$0.3Na2O$—$Al_2O_3$-$2SiO_2$-$4.5H_2O$), and zeolite 13X (e.g., $5Na_2O$-$5Al_2O_3$-$14SiO_2$, $Na_x[(AlO_2)_x$—$(SiO_2)_y]$). The first temperature and first $CO_2$ pressure may be any magnitude, provided that the first temperature and the first $CO_2$ pressure are representative of an adsorption condition defined by the adsorption isotherm of zeolite sorbent 104 reflecting adsorption of gaseous $CO_2$. In a particular embodiment, the first $CO_2$ pressure exceeds 70 psig and the first temperature exceeds 100° C. In another particular embodiment, zeolite sorbent 104 is zeolite 13X and the input gas stream 102 is shifted syngas comprised $CO_2$ and $H_2O$ at a temperature of 120° C.-180° C. and a total pressure of 230-330 psig, and the input gas stream 102 and the zeolite sorbent 104 are contacted in the capture vessel 103 at a first temperature of 120° C.-180° C. and a first $CO_2$ pressure in accordance with the total pressure and $CO_2$ mol % in input gas stream 102.

As the input gas stream 102 passes through the bed of zeolite sorbent 104, $CO_2$ is adsorbed and a $CO_2$ front forms in the zeolite sorbent bed and travels through the bed, generating loaded zeolite sorbent containing at least adsorbed $CO_2$. Exothermic heat generated by $CO_2$ adsorption on the zeolite bed is removed from the capture vessel with a first heat transfer $Q_1$ to substantially maintain conditions at the first temperature during the adsorption. A substantially $CO_2$-depleted gas stream 105 may be drawn from the capture vessel.

In a particular embodiment, input gas stream 104 is further comprised of $H_2O$, such that the zeolite sorbent further adsorbs $H_2O$ and the $CO_2$-depleted gas stream 105 is further depleted of $H_2O$. In another particular embodiment, the $CO_2$-depleted gas stream 105 powers an Integrated Gasification Combined Cycle.

First heat transfer $Q_1$ may be accomplished using a variety of heat sink means known in the art. For example, the heat sink could be a coolant fluid in a heat exchanger, another process technology requiring heat at about or less than the temperature of adsorption, or simply the atmosphere. Non-sorbed components of the gas that contacts the adsorbing media may also remove some exothermic heat during adsorption. In a particular embodiment, first heat transfer $Q_1$ is accomplished with a heat exchanger using water as a coolant fluid.

In a further embodiment, process gas stream 101 has a temperature exceeding the first temperature, and is cooled by heat transfer $Q_4$, so that input gas stream 102 enters capture vessel 103 at a temperature below that of process gas stream 101. In an exemplary application, process gas stream 101 is a shifted syngas stream produced in a WGS reactor at an approximate temperature of 250° C. and the first temperature in capture vessel 103 is 120-150° C., and heat transfer $Q_4$ is utilized to remove heat such that input gas stream 104 enters capture vessel 103 within the approximate temperature range 120-150° C. Heat transfer $Q_4$ may be accomplished using a variety of heat sink means known in the art, such as a coolant fluid in a heat exchanger, another process technology requiring heat at about or less than the temperature of adsorption, or simply the atmosphere. In a particular embodiment, heat transfer $Q_4$ is accomplished with a heat exchanger using a medium in communication with other heat exchangers utilized in the method, so that at least some portion of heat transfer $Q_4$ may be utilized elsewhere in the process, as discussed infra.

The input gas stream 102 and the zeolite sorbent 104 are contacted in the capture vessel 103 at the first temperature and the first $CO_2$ pressure for a fixed period of time which is sufficiently short in duration so as to prevent the break-through of carbon dioxide in $CO_2$-depleted gas stream 105. The quantity of $CO_2$ in $CO_2$-depleted gas stream 105 which designates break-through is not specified within this method and may be determined by an operator.

Following break-through, the zeolite sorbent is referred to as loaded zeolite sorbent within this method. Regeneration of the loaded zeolite sorbent is discussed with reference to FIG. 1B. At FIG. 1B, regeneration vessel 106 holds loaded zeolite sorbent 107. Within regeneration vessel 106, loaded zeolite sorbent 107 is surrounded by a $CO_2$ atmosphere comprised of at least 90 mol % $CO_2$ at a second $CO_2$ pressure, where the second $CO_2$ pressure is greater than the first $CO_2$ pressure. A second heat transfer $Q_2$ increases the temperature of loaded zeolite sorbent 107 to a second temperature, where the second temperature is greater than the first temperature. As a result of the increase in temperature, loaded zeolite sorbent 107 desorbs some portion of the $CO_2$ adsorbed at the first temperature. The desorbed $CO_2$ enters the $CO_2$ atmosphere in regeneration vessel 106 at the second $CO_2$ pressure, and output gas stream 108 is generated by drawing some portion of the $CO_2$ atmosphere and the desorbed $CO_2$ from regeneration vessel 106. Output gas stream 108 thereby maintains a high purity of $CO_2$ and is produced at a $CO_2$ pressure exceeding the first $CO_2$ pressure of input gas stream 102.

The regeneration of loaded zeolite sorbent 107 in a high $CO_2$ pressure atmosphere is a novel aspect of the method disclosed herein, and facilitates a high purity and high $CO_2$ pressure for output gas stream 108. This is in marked contrast to standard temperature-swing adsorption processes, which often produce a diluted product stream through the use of a hot, inert regeneration gas in order to provide a high temperature, low $CO_2$ pressure environment for desorption. Similarly, this is in marked contrast to typical pressure-swing adsorption processes, which by necessity result in a product stream having a lower $CO_2$ pressure than the input gas stream. Within the novel method disclosed here, regeneration in an environment of increased $CO_2$ pressure allows for the production of a high pressure, high purity $CO_2$ stream without the necessity for further separation operations or subsequent compression, greatly aiding subsequent storage and sequestration operations.

The second temperature and the second $CO_2$ pressure are representative of an adsorption condition defined by an adsorption isotherm of zeolite sorbent 107 reflecting adsorption of gaseous $CO_2$ and, as specified supra, exceed the first temperature and the first $CO_2$ pressure respectively. Similar to the first temperature and the first $CO_2$ pressure discussed supra, the second temperature and the second $CO_2$ pressure may be mean values around which slight variation occurs as a result of operational constraints. The acceptable magnitude of variation of the second temperature and the second $CO_2$ pressure is not a limiting value, except that the magnitude of variation should be controlled such that the lowest magnitude of the second temperature exceeds the highest value of the first temperature, and such that the lowest value of the second $CO_2$ pressure exceeds the highest value of the first $CO_2$ pressure, so that adsorption in capture vessel 103 and desorption in regeneration vessel 106 can be expected to occur within the potential ranges of the first temperature and the second temperature, and an output gas stream can be produced at a second $CO_2$ pressure exceeding the first $CO_2$ pressure. Thus, when the method specifies maintaining a second temperature or a second $CO_2$ pressure, it is understood that this is intended to indicate maintaining these parameters within the acceptable magnitude of variation about the mean value.

In a particular embodiment, loaded zeolite sorbent 107 is zeolite 13X with adsorbed $CO_2$ and $H_2O$, and the second temperature is at least 275° C., so that loaded zeolite sorbent 107 desorbs both $CO_2$ and substantially all $H_2O$ in regeneration vessel 106. In another embodiment, where the loaded zeolite sorbent 107 is zeolite 13X and the input gas stream 102 is shifted syngas comprised of $CO_2$ and $H_2O$, a second temperature of 275° C.-380° C. and a second $CO_2$ pressure of approximately 209-297 psig is utilized for desorption in regeneration vessel 106, following adsorption in capture vessel 103 under a first temperature of 120° C.-180° C. and a first $CO_2$ pressure in accordance with a total pressure between 230-330 psig and the $CO_2$ mol % in input gas stream 102. In the latter embodiment, the zeolite 13X $CO_2$ capture capacities are approximately 3.0 mol/kg sorbent in the capture vessel and 0.01 mol/kg in the regeneration vessel. The low $CO_2$ capture capacity under the second temperature and in an atmosphere of 90 mol % gaseous $CO_2$ allows regeneration at a high second $CO_2$ pressure.

Second heat transfer $Q_2$ is applied indirectly to the adsorbent material through a heating coil, electrical heat source, a heat exchanger in intimate association with the adsorbent material, or other heat source means known in the art. In a particular embodiment, second heat transfer $O_2$ is accomplished with a heat exchanger using some portion the steam generated by an IGCC plant powered by at least a portion of 002-depleted gas stream 105.

In a particular embodiment, output gas stream 108 is indirectly cooled to a third temperature below the second temperature by heat exchanger 119, and a total pressure of at least the second $CO_2$ pressure is maintained by back pressure regulating means 120, in order to produce final $CO_2$ stream 110. In an application where the output gas stream 108 encounters back pressure regulating means 120 without substantial change in the output gas stream 108 composition, the total pressure maintained by back pressure regulating means 120 is the second $CO_2$ pressure. The reduction in temperature to the third temperature is particularly advantageous when further compression of final $CO_2$ stream 110 outside the method disclosed herein is desired, and the lower third temperature of the final $CO_2$ stream serves to reduce subsequent compressor work required. In such applications, output gas stream 108 may be indirectly cooled to the third temperature using a variety of heat sink means known in the art. For example, the heat sink could be a coolant fluid in a heat exchanger, another process technology requiring heat at about or less than the temperature of adsorption, or simply the atmosphere. In a particular embodiment, output gas stream 108 is indirectly cooled with a heat exchanger using water as a coolant fluid. Similarly, back pressure regulating means 120 may be variety of pressure regulating devices known in the art. For example, back pressure regulating means 120 may be a back pressure regulator valve.

In a particular embodiment, where input gas stream 102 is further comprised of $H_2O$ and output gas stream 108 contains $H_2O$, moisture removing means 111 may be employed following heat exchanger 119 in order to remove some portion of the $H_2O$ at the third temperature, such that final $CO_2$ stream 110 has a reduced moisture content as compared to output gas stream 108. In a particular embodiment, the third temperature is below the saturation temperature for $H_2O$ in output gas stream 108, and the $H_2O$ is removed as a condensate using screens or other tortuous flow paths in moisture removing means 111 as is known in the art.

In a further embodiment, the $CO_2$ atmosphere in regeneration vessel 106 is provided by regeneration stream 109, comprised of a portion of output gas stream 108 as indicated at FIG. 1B. When the $CO_2$ atmosphere is provided by regeneration stream 109, back pressure regulating means 120 serves to maintain regeneration stream 109 at the total pressure of output gas stream 108, and regeneration stream 109 is heated by a heat transfer $Q_3$ to match or approach the second temperature condition in regeneration vessel 106. In a particular embodiment, the heat transfer $Q_3$ is accomplished with a heat exchanger using a medium in communication with other heat exchangers utilized in the method, so that at least some portion of heat transfer $Q_3$ may be comprised of heat removed elsewhere in the process, as discussed infra. Additionally, when input gas stream 102 is further comprised of $H_2O$ and output gas stream 108 contains $H_2O$, regeneration stream 109 follows moisture removing means 111 to reduce the moisture content of regeneration stream 109.

Regeneration is generally conducted in regeneration vessel 106 for a fixed period of time which is sufficiently long in duration to desorb substantially all $CO_2$ and $H_2O$ when applicable from the loaded zeolite sorbent, however the fixed period of time for regeneration is not specified within this method and may be determined by an operator using various indications known to those skilled in the art. For example, comparison of flow rates between output gas stream 108 or final $CO_2$ stream 110 and regeneration stream 109 may be utilized as an indication of regeneration completion, or the fixed period of time may be specified based on past experience with the system, or using other methodologies known to those skilled in the art. Following regeneration, the zeolite sorbent is referred to as unloaded zeolite sorbent within this method.

Regeneration in the manner provided thus provides a high purity product stream of $CO_2$ having a higher $CO_2$ pressure than input gas stream 102 and having a total pressure commiserate with or greater than the first $CO_2$ pressure of input gas stream 102. Additionally, in a particular embodiment, final $CO_2$ stream 110 may be produced at a third temperature below the first temperature, greatly reducing subsequent compression burdens if desired. In an exemplary embodiment where input gas stream 102 is shifted syngas comprised of $CO_2$ and $H_2O$ and adsorption occurs under a first temperature of 150° C. and a first $CO_2$ pressure of approximately 109 psig (reflecting a total pressure of 280 psig and $CO_2$ content of 39 mol %), followed by regeneration at a second temperature of 350° C. and a second $CO_2$ pressure of approximately 252 psig (reflecting a $CO_2$ atmosphere total pressure of 280 psig at a $CO_2$ content of at least 90 mol %), a final $CO_2$ stream 110 with a purity of 98 mol % $CO_2$ and having a total pressure of 280 psig at a temperature of 76° C. may be produced. The production of this high pressure, high purity $CO_2$ stream without the necessity for further separation operations or subsequent compression is based on regeneration in a $CO_2$ atmosphere of at least 90 mol % $CO_2$, and is a novel aspect of this disclosure.

Figure 1A:
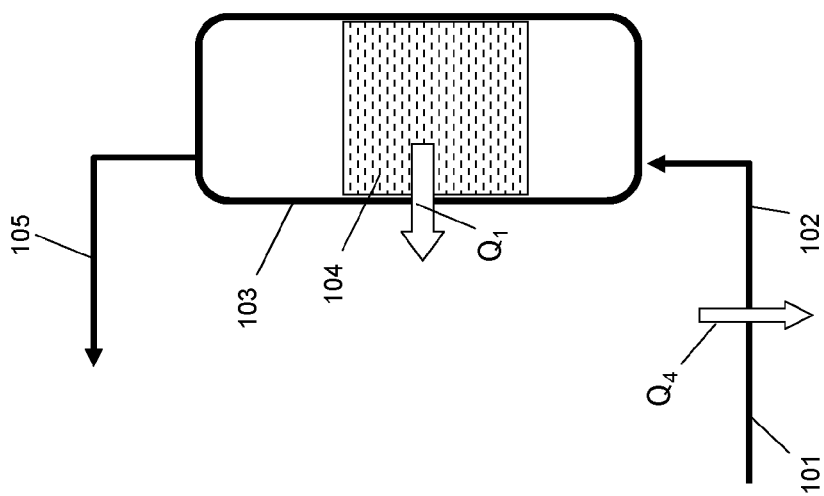
FIG. 1A illustrates $CO_2$ separation for an input gas stream comprised of $CO_2$ and other gaseous constituents utilizing a zeolite sorbent.

It is understood that while capture vessel 103 at FIG. 1A and regeneration vessel 106 at FIG. 1B have been discussed as separate and distinct entities in the foregoing explanation, capture vessel 103 and regeneration vessel 106 may be a single vessel capable of providing both the adsorption and regeneration conditions discussed. Additionally, it is understood that when capture vessel 103 and regeneration vessel 106 are separate vessels, the sorbent may be transferred between capture vessel 103 and regeneration vessel 106, such that loaded zeolite sorbent is transferred from capture vessel 103 to regeneration vessel 106, and unloaded zeolite sorbent is transferred from regeneration vessel 106 to capture vessel 103. The unloaded zeolite sorbent may be cooled during the transfer from regeneration vessel 106 such that the unloaded zeolite sorbent may serve as zeolite sorbent 104 in capture vessel 103.

Figure 2:
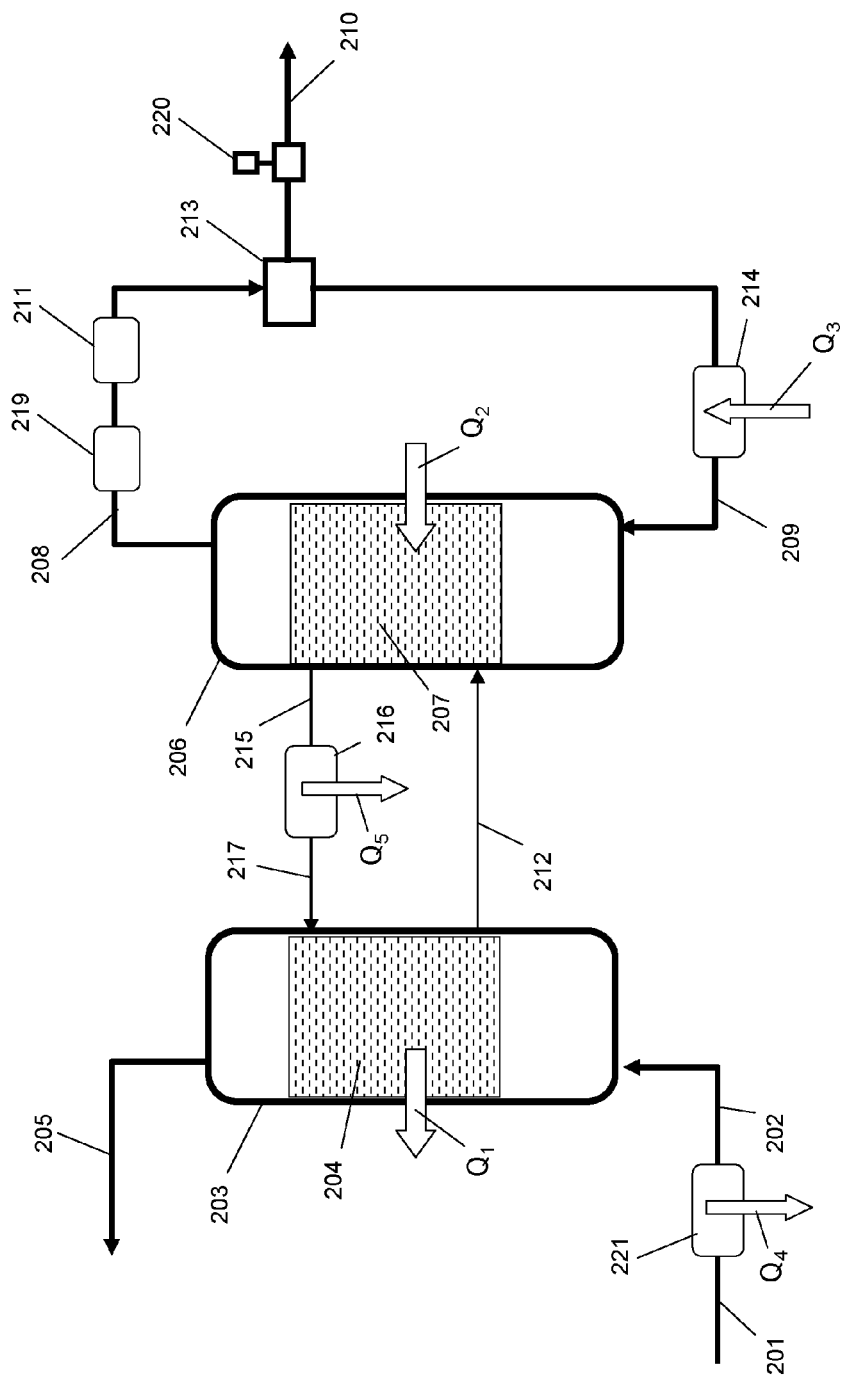
FIG. 2 illustrates a cyclic process using a capture reactor and a regeneration reactor with zeolite sorbent transfer in a thermally integrated cycle.

FIG. 2 illustrates a process flow diagram demonstrating the method operated in a substantially continuous mode utilizing separate capture and regeneration reactors and thermally integrated operation. In a particular embodiment, process gas stream 201 is a shifted syngas stream exiting a WGS at a composition of approximately 39 mol % $CO_2$, 54 mol % $H_2$, and 7 mol % $H_2O$, at a temperature of approximately 250° C. and a total pressure of 280 psig. Process gas stream 201 undergoes heat transfer $Q_4$ in heat exchanger 221, and input gas stream 202 exits heat exchanger 221 with a composition of approximately 39 mol % $CO_2$, 54 mol % $H_2$, and 7 mol % $H_2O$, at a first temperature of approximately 150° C. and a total pressure of 280 psig, representing a first $CO_2$ pressure of approximately 109 psig. Heat exchanger 221 is an indirect heat exchanger such as a shell-and-tube heat exchanger facilitating heat transfer from process gas stream 201 to 25° C. cooling water.

Using the exemplary conditions specified, input gas stream 202 enters capture reactor 203 at the first temperature of approximately 150° C. and the first $CO_2$ pressure of approximately 109 psig and contacts zeolite sorbent 204 at the first temperature. Zeolite sorbent 204 adsorbs substantially all $CO_2$ and $H_2O$, and $CO_2$ depleted gas stream 205 comprised of $H_2$ exits capture reactor 203 at the first temperature and a total pressure of 280 psig. In a particular embodiment, $CO_2$ depleted gas stream 203 exits to an IGCC burning $H_2$ for the production of steam at a temperature of 550° C.

Under the exemplary conditions specified, when zeolite 13X is utilized as zeolite sorbent 204 in the capture reactor, the zeolite 13X sorbent has a $CO_2$ capture capacity of approximately 3.0 mol/kg and an $H_2O$ capture capacity of approximately 1.11 mol/kg. The heat of adsorption is approximately 35 kJ/mol $CO_2$ and 15.5 kJ/mol $H_2O$. The exothermic heat generated by adsorption in the capture reactor is removed by first heat transfer $Q_1$ through an indirect heat exchanger facilitating heat transfer from zeolite sorbent 204 and capture reactor 203 to 25° C. cooling water.

The input gas stream 202 and the zeolite sorbent 204 are contacted in capture reactor 203 at the first temperature and the first $CO_2$ pressure for a fixed period of time which is sufficiently short in duration so as to prevent the breakthrough of carbon dioxide in $CO_2$-depleted gas stream 205. Following the fixed period of time, loaded zeolite sorbent at the first temperature and first $CO_2$ pressure is transferred to regeneration reactor 206 via transport path 212. Transport may be accomplished in a variety of ways known to those skilled in the art. For example, zeolite sorbent 204 may be arranged in capture reactor 203 in a plurality of separate beds to from a moving bed arrangement for transfer from capture reactor 203 to regeneration reactor 206, where the moving bed arrangement is cycled such that a given bed is transferred after remaining in the adsorption conditions in capture reactor 203 for the fixed period of time. Other arrangements include fluidized transfer of sorbent pellets from capture reactor 203 to regeneration reactor 206 following the fixed period of time. Within the discussion of the particular embodiment depicted at FIG. 2, it is only necessary that loaded zeolite sorbent be transferred from capture reactor 203 to regeneration reactor 206 under temperature and pressure conditions that maintain a substantial majority of adsorbed $CO_2$ and $H_2O$ adsorbed on the loaded zeolite sorbent, so that the substantial majority of adsorbed $CO_2$ and $H_2O$ may be desorbed in regeneration reactor 206.

Regeneration reactor 206 is maintained at a second temperature and second $CO_2$ pressure. In a particular embodiment, regeneration reactor 206 is maintained at approximately 350° C. and contains a $CO_2$ atmosphere comprised of greater than 90 mol % gaseous $CO_2$ at a total pressure of approximately 280 psig. Under these exemplary conditions, when zeolite 13X is the sorbent utilized, this results in a $CO_2$ capture capacity of approximately 0.01 mol/kg and substantially complete dehydration. A second heat transfer $Q_2$ transfers heat to the loaded zeolite sorbent through indirect heat exchange in order to raise and maintain the loaded zeolite sorbent at the second temperature as $CO_2$ and $H_2O$ are desorbed. In a particular embodiment, second heat transfer $Q_2$ is provided by indirect heat transfer from a portion of the 550° C. steam generated by the IGCC fueled by $CO_2$-depleted gas stream 205.

Output gas stream 208 comprised of $CO_2$ and $H_2O$ exits regeneration reactor 206 at the second temperature and a second $CO_2$ pressure of approximately 252 psig, reflecting the $CO_2$ atmosphere total pressure of 280 psig at a $CO_2$ content of at least 90 mol %. Output gas stream 208 is then cooled by heat exchanger 219 to a third temperature less than the second temperature. In the particular embodiment shown, output gas stream 208 is cooled to approximately 76° C. through indirect heat exchange with 25° C. cooling water. This serves to condense moisture in output gas stream 208 for subsequent removal by moisture removing means 211, as well as reduce compressor work loads for any subsequent compression operations which may exist as subsequent requirements.

In a particular embodiment utilizing zeolite 13X, an input gas stream of 39 mol % $CO_2$, 54 mol % $H_2$, and 7 mol % $H_2O$, a first temperature of 150° C., and a first $CO_2$ pressure of approximately 109 psig in capture reactor 203, with regeneration in regeneration reactor 206 at a second temperature of 350° C. and a second $CO_2$ pressure of approximately 271 psig, output gas stream 208 exits regeneration reactor 206 with a composition of 96.7 mol % $CO_2$ and 3.3 mol % $H_2O$. Following cooling by heat exchanger 219 and $H_2O$ removal by moisture removing means 211, output gas stream 208 has a composition of 98.0 mol % $CO_2$ and 2.0 mol % $H_2O$.

In the embodiment illustrated at FIG. 2, following moisture removal, flow diverting means 213 splits output gas stream 208 into final $CO_2$ stream 210 and regeneration stream 209. Flow diverting means 213 may be any flow diverting device known in the art, such as a flow splitting valve rated for the prevailing conditions. Back pressure regulating means 220 maintains output gas stream 208 and regeneration gas stream 209 at the second $CO_2$ pressure. In a particular embodiment, the process depicted at FIG. 2 provides a final $CO_2$ stream 210 having a composition of 98.0 mol % $CO_2$ and 2.0 mol % $H_2O$, at a total pressure of 280 psig and a temperature of 76° C. The high purity, high pressure, and reduced temperature stream produced provides significant advantage in terms of any subsequent compression required, and eliminates or greatly reduces any further gas separation operations.

In the embodiment illustrated at FIG. 2, regeneration gas stream 209 is then heated by a heat transfer $Q_3$ in heat exchanger 214 to match or approach the second temperature condition in regeneration reactor 206, and recirculated to regeneration reactor 206 to maintain the $CO_2$ atmosphere in regeneration reactor 206. In the embodiment shown, heat exchanger 214 facilitates heat transfer $Q_3$ as an indirect heat exchange from water at a temperature greater than the third temperature to regeneration gas stream 209.

Regeneration is conducted in regeneration vessel 206 for a fixed period of time which is sufficiently long in duration to desorb substantially all $CO_2$ and $H_2O$ and produce unloaded zeolite sorbent. Having substantially desorbed all $CO_2$ and $H_2O$, the unloaded zeolite sorbent is transferred from regeneration reactor 206 via transport path 215. In the embodiment illustrated at FIG. 2, the unloaded zeolite sorbent is cooled with heat transfer $Q_5$ to match or approach the first temperature condition in capture reactor 206, so that the cooled unloaded zeolite sorbent may enter capture reactor 203 via transport path 217 to serve as the zeolite sorbent in capture reactor 203. In the embodiment shown, heat exchanger 216 facilitates heat transfer $Q_5$ by indirect heat exchange between the loaded zeolite sorbent and 25° C. cooling water.

Transport of the unloaded zeolite sorbent via transport paths 215 and 217 may be accomplished similarly to the means employed for transport path 212.

In a particular embodiment, heat exchangers 221, 216, and 214 are in thermal communication so that heat transfer $Q_5$ may be comprised of heat from heat transfers $Q_4$ and $Q_3$. This serves to reduce the overall heat input required by the process. In the particular embodiment shown at FIG. 2, heat exchangers 221, 216, and 214 utilize water as a working fluid to transport heat from heat exchanger 221 and 216 to heat exchanger 214.

Further, while capture and regeneration are shown with a counter-current geometry in capture reactor 203 and regeneration reactor 206, it is understood that capture reactor 203 and regeneration reactor 206 could be operated in a co-current geometry.

Thus, this disclosure provides a method of $CO_2$ separation utilizing zeolite adsorbents that allows for higher pressure regeneration, such that a higher pressure $CO_2$ product stream is produced and compression burdens which might exist in sequestration and storage operations are reduced or eliminated. Further, the method provides for $CO_2$ separation utilizing zeolite adsorbents in a manner that preserves adsorption capacities at higher temperatures, such that parasitic external refrigeration loads are reduced or eliminated. Further, the method provides for $CO_2$ separation utilizing zeolite adsorbents in a TSA process where sorbent regeneration occurs in an atmosphere of $CO_2$, such that a pure stream of the $CO_2$ is generated without the need for further gas separations.

It is understood that while specific temperatures and pressures have been utilized for illustrative purposes, the specific temperature and pressures are exemplary only. Within this method, it is only necessary that the second temperature exceeds the first temperature and that the second $CO_2$ pressure exceeds the first $CO_2$ pressure, so that so that adsorption at the first temperature and desorption at the second temperature can be expected to occur, and an output gas stream can be produced at a second $CO_2$ pressure exceeding the first $CO_2$ pressure. Similarly, it is understood that while specific zeolites have been utilized for illustrative purpose, the specific zeolites are exemplary only. Within this method, the zeolite utilized may be any zeolite sorbent which adsorbs gaseous $CO_2$ in accordance with an adsorption isotherm as defined herein. Further, it is understood that the term "capture reactor" and "regeneration reactor" may specify single reactors or may refer to a plurality of reactors each providing the conditions specified within this disclosure.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as if each individual publication or patent document were so individually denoted.

The invention claimed is:

1. A method of separating $CO_2$ from a process gas stream comprised of $CO_2$ and other gaseous constituents in an adsorption/desorption cycle using a zeolite sorbent, where the desorption cycle is conducted under conditions of increased temperature and increased $CO_2$ pressure to produce a high pressure output gas stream, comprising:

Generating an input gas stream comprised of the process gas stream, such that the input gas stream is comprised of $CO_2$ and other gaseous constituents, and such that the input gas stream has a first $CO_2$ pressure;

Contacting the input gas stream with the zeolite sorbent at a first temperature and the first $CO_2$ pressure, such that the zeolite sorbent adsorbs some portion of the $CO_2$ from the input gas stream, and transferring heat from the zeolite sorbent with a first heat transfer to maintain the zeolite sorbent at the first temperature, thereby producing a loaded zeolite sorbent;

Surrounding the loaded zeolite sorbent with a $CO_2$ atmosphere comprised of at least 90 mol % $CO_2$ to attain a second $CO_2$ pressure, where the second $CO_2$ pressure is greater than the first $CO_2$ pressure, and increasing the temperature of the loaded zeolite sorbent to a second temperature by transferring heat to the loaded zeolite sorbent with a second heat transfer, thereby producing desorbed $CO_2$ from the loaded zeolite sorbent and producing an unloaded zeolite sorbent; and Generating the output gas stream, where the output gas stream is comprised of some portion of the $CO_2$ atmosphere and some portion of the desorbed $CO_2$, thereby separating $CO_2$ from a process gas stream comprised of $CO_2$ and other gaseous constituents in an adsorption/desorption cycle using a zeolite sorbent, where the desorption cycle is conducted under conditions of increased temperature and increased $CO_2$ pressure to produce a high pressure output gas stream.

2. The method of claim 1 where the input gas stream is further comprised of $H_2O$ and the second temperature is at least 275 degrees Celsius.

3. The method of claim 1 where the $CO_2$ atmosphere surrounding the loaded zeolite is provided by a regeneration stream comprised of a portion of the output gas stream.

4. The method of claim 1 where the input gas stream is contacted with a zeolite sorbent in a capture reactor, and including transferring the loaded zeolite sorbent from the capture reactor to a regeneration reactor, and where the loaded zeolite sorbent is surrounded with a $CO_2$ atmosphere in the regeneration reactor, and the output gas stream is generated from the regeneration reactor.

5. The method of claim 4 including transferring the unloaded zeolite sorbent from the regeneration reactor to the capture reactor and cooling the unloaded zeolite during the transfer, such that the unloaded zeolite sorbent serves as the zeolite sorbent at the first temperature and the initial pressure.

6. The method of claim 5 where the $CO_2$ atmosphere surrounding the loaded zeolite in the regeneration reactor is provided by a regeneration stream comprised of a portion of the output gas stream.

7. The method of claim 6 including cooling the output gas stream to a third temperature then splitting the output gas stream into the regeneration stream and a final $CO_2$ stream, and including heating the regeneration stream with a third heat transfer.

8. The method of claim 7 where the input gas stream is further comprised of $H_2O$, and including removing some portion of the $H_2O$ from the output gas stream at the third temperature.

9. The method of claim 7 where the process gas stream has a temperature exceeding the first temperature, and including cooling the process gas stream to the first temperature with a fourth heat transfer and transferring heat from the fourth heat transfer to the regeneration stream, such that the third heat transfer is comprised of heat from the fourth heat transfer.

10. The method of claim 9 where the process gas stream is a shifted syngas stream from a water-gas-shift reactor.

11. The method of claim 7 where the unloaded zeolite sorbent is cooled during transfer with a fifth heat transfer, and including transferring heat from the fifth heat transfer to the regeneration stream, such that the third heat transfer is comprised of heat from the fifth heat transfer.

12. The method of claim 4 including generating a $CO_2$-depleted gas stream from the capture reactor, generating steam using an Integrated Gasification Combined Cycle powered by at least a portion of the $CO_2$-depleted gas stream, and indirectly transferring heat from a portion of the generated steam to the regeneration reactor, such that the second heat transfer is comprised of heat from the portion of the generated steam.

13. The method of claim 1 where the zeolite sorbent is one of zeolite 4A, zeolite 5A, or zeolite 13X.

14. The method of claim 1 where the first $CO_2$ pressure exceeds 70 psig and the first temperature exceeds 100 degrees Celsius.

15. A method of separating $CO_2$ from a process gas stream comprised of $CO_2$, $H_2O$ and other gaseous constituents in an adsorption/desorption cycle using a zeolite sorbent, where the desorption cycle is conducted under conditions of increased temperature and increased $CO_2$ pressure to produce a final $CO_2$ stream at high pressure, comprising:
    generating an input gas stream comprised of the process gas stream, such that the input gas stream is comprised of $CO_2$, $H_2O$ and other gaseous constituents, and such that the input gas stream has a first $CO_2$ pressure;
    Contacting the input gas stream with the zeolite sorbent at a first temperature and the first $CO_2$ pressure in a capture reactor, such that the zeolite sorbent adsorbs some portion of the $CO_2$ and some portion of the $H_2O$ from the input gas stream, and transferring heat from the zeolite sorbent with a first heat transfer to maintain the zeolite sorbent at the first temperature, thereby producing a loaded zeolite sorbent, and generating a $CO_2$-depleted gas stream from the capture reactor;
    transferring the loaded zeolite sorbent from the capture reactor to a regeneration reactor, where the regeneration reactor contains a $CO_2$ atmosphere, where the $CO_2$ atmosphere is comprised of at least 90 mol % $CO_2$ and where the $CO_2$ atmosphere has a second $CO_2$ pressure greater than the first $CO_2$ pressure;
    increasing and maintaining the temperature of the loaded zeolite sorbent in the regeneration reactor at a second temperature by transferring heat to the loaded zeolite sorbent with a second heat transfer, where the second temperature exceeds the first temperature and the second temperature is at least 275 degrees Celsius, thereby producing desorbed $CO_2$ and $H_2O$ from the loaded zeolite sorbent and producing an unloaded zeolite sorbent;
    Generating an output gas stream from the regeneration reactor, where the output gas stream is comprised of some portion of the $CO_2$ atmosphere and some portion of the desorbed $CO_2$ and $H_2O$, and cooling the output gas stream to a third temperature below the first temperature and removing some portion of the $H_2O$ in the output gas stream;
    Splitting the output gas stream at the third temperature into a regeneration gas stream and the final $CO_2$ stream, and directing the regeneration gas stream to the regeneration reactor, such that the $CO_2$ atmosphere is comprised of $CO_2$ from the regeneration stream; and
    transferring the unloaded zeolite sorbent from the regeneration reactor to the capture reactor and cooling the unloaded zeolite sorbent during the transfer, such that the unloaded zeolite sorbent serves as the zeolite sorbent at the first temperature and the initial pressure, thereby separating $CO_2$ from a process gas stream comprised of $CO_2$, $H_2O$ and other gaseous constituents in an adsorption/desorption cycle using a zeolite sorbent, where the desorption cycle is conducted under conditions of increased temperature and increased $CO_2$ pressure to produce the final $CO_2$ stream at high pressure.

16. The method of claim 15 where the first temperature exceeds 120 degrees Celsius and the second temperature further exceeds 330 degrees Celsius.

17. The method of claim 15 where the regeneration stream is heated with a third heat transfer, and where the process gas stream has a temperature exceeding the first temperature and including cooling the process gas stream to the first temperature with a fourth heat transfer, and where the unloaded zeolite sorbent is cooled during transfer with a fifth heat transfer, and transferring heat from the fourth heat transfer and the fifth heat transfer to the regeneration stream, such that the third heat transfer is comprised of heat from the fourth heat transfer and the fifth heat transfer.

18. The method of claim 16 where the process gas stream is a shifted syngas stream from a water-gas-shift reactor, and an Integrated Gasification Combined Cycle powered by at least a portion of the $CO_2$-depleted gas stream produces generated steam, and including indirectly transferring heat from a portion of the generated steam to the capture reactor, such that the second heat transfer is comprised of heat from the portion of the generated steam.

19. A method of separating $CO_2$ from a shifted syngas stream comprised of $CO_2$, $H_2O$ and $H_2$ in an adsorption/desorption cycle using a zeolite sorbent, where the desorption cycle is conducted under conditions of increased temperature and increased $CO_2$ pressure to produce a final $CO_2$ stream at high pressure, comprising:
    Generating the shifted syngas stream at a shifted syngas temperature greater than 120 degrees Celsius in a WGS reactor;
    Cooling the shifted syngas stream to a first temperature, where the first temperature is less than the shifted syngas temperature and at least 120 degrees Celsius, by transferring heat from the shifted syngas stream, such that the shifted syngas stream has a first $CO_2$ pressure at the first temperature;
    Contacting the shifted syngas stream with the zeolite sorbent at the first temperature and the first $CO_2$ pressure in a capture reactor, such that the zeolite sorbent adsorbs some portion of the $CO_2$ and some portion of the $H_2O$ from the shifted syngas stream, and transferring heat from the zeolite sorbent with a first heat transfer to maintain the zeolite sorbent at the first temperature, thereby producing a loaded zeolite sorbent, and generating an $H_2$ gas stream from the capture reactor, where the $H_2$ gas stream is comprised of the shifted syngas stream less the some portion of the $CO_2$ and the some portion of the $H_2O$ adsorbed by the zeolite sorbent;
    generating steam having a steam temperature greater than 275 degrees Celsius using an Integrated Gasification Combined Cycle powered by at least a portion of the $H_2$ gas stream;
    transferring the loaded zeolite sorbent from the capture reactor to a regeneration reactor, where the regeneration reactor contains a $CO_2$ atmosphere, where the $CO_2$ atmosphere is comprised of at least 90 mol % $CO_2$ and where the $CO_2$ atmosphere has a second $CO_2$ pressure greater than the first $CO_2$ pressure, and where the second $CO_2$ pressure is at least 225 psig;
    increasing and maintaining the temperature of the loaded zeolite sorbent in the regeneration reactor at a second temperature, where the second temperature exceeds the first temperature and the second temperature is at least 275 degrees Celsius and the second temperature is less than the steam temperature, by transferring heat indirectly to the loaded zeolite sorbent from the steam with a second heat transfer, thereby producing desorbed $CO_2$ and $H_2O$ from the loaded zeolite sorbent and producing an unloaded zeolite sorbent;

transferring the unloaded zeolite sorbent from the regeneration reactor to the capture reactor, and cooling the unloaded zeolite sorbent to the first temperature by transferring heat from the unloaded zeolite sorbent;

Generating an output gas stream from the regeneration reactor, where the output gas stream is comprised of some portion of the $CO_2$ atmosphere and some portion of the desorbed $CO_2$ and $H_2O$, and cooling the output gas stream to a third temperature below the first temperature and removing some portion of the $H_2O$ in the output gas stream;

Splitting the output gas stream at the third temperature into a regeneration gas stream and a final $CO_2$ stream; and Heating the regeneration stream with a third heat transfer, where the third heat transfer is comprised of heat from the transferring heat from the shifted syngas stream and heat from the transferring heat from the unloaded zeolite sorbent, and directing the regeneration gas stream to the regeneration reactor, such that the $CO_2$ atmosphere is comprised of $CO_2$ from the regeneration stream, thereby separating $CO_2$ from a process gas stream comprised of $CO_2$, $H_2O$ and other gaseous constituents in an adsorption/desorption cycle using a zeolite sorbent, where the desorption cycle is conducted under conditions of increased temperature and increased $CO_2$ pressure to produce the final $CO_2$ stream at high pressure.

20. The method of claim 19 where the shifted syngas temperature further exceeds 200 degrees Celsius and the second temperature further exceeds 330 degrees Celsius.

* * * * *